(12) United States Patent
Saito et al.

(10) Patent No.: US 9,536,246 B2
(45) Date of Patent: Jan. 3, 2017

(54) CONTENT RECOMMENDATION SYSTEM, CONTENT RECOMMENDATION DEVICE, AND CONTENT RECOMMENDATION METHOD

(75) Inventors: Katsu Saito, Saitama (JP); Wataru Onogi, Kanagawa (JP); Masaaki Koyanagi, Tokyo (JP); Takayuki Sakamoto, Kanagawa (JP)

(73) Assignee: SONY CORPORTION, Tokyo (JP)

( * ) Notice: Subject to any disclaimer, the term of this patent is extended or adjusted under 35 U.S.C. 154(b) by 207 days.

(21) Appl. No.: 13/116,932

(22) Filed: May 26, 2011

(65) Prior Publication Data

US 2011/0302240 A1 Dec. 8, 2011

(30) Foreign Application Priority Data

Jun. 3, 2010 (JP) ................................ 2010-128242

(51) Int. Cl.
*G06F 17/30* (2006.01)
*G06Q 30/02* (2012.01)

(52) U.S. Cl.
CPC ......... *G06Q 30/02* (2013.01); *G06F 17/30867* (2013.01)

(58) Field of Classification Search
CPC .......................... G06F 17/30867; G06Q 30/02
USPC ........................................................ 709/203
See application file for complete search history.

(56) References Cited

U.S. PATENT DOCUMENTS 6,308,175 B1* 10/2001 Lang ................. G06F 17/30702
707/608
2004/0068552 A1* 4/2004 Kotz et al. .................... 709/218
2007/0011203 A1* 1/2007 Tsunoda ..................... 707/104.1
2007/0027926 A1* 2/2007 Kinouchi .......... G06F 17/30017
2008/0082633 A1* 4/2008 Koyama et al. .............. 709/219
2010/0169340 A1* 7/2010 Kenedy et al. ............... 707/758
2010/0251280 A1* 9/2010 Sofos ..................... H04H 60/31
725/14

FOREIGN PATENT DOCUMENTS

JP 2006-58947 3/2006

* cited by examiner

*Primary Examiner* — Andrew Lai
*Assistant Examiner* — M Mostazir Rahman
(74) *Attorney, Agent, or Firm* — Chip Law Group

(57) ABSTRACT

A content recommendation system includes: a client terminal operated by a user; and a content recommendation server that recommends content to the terminal through a network and includes a preference discrimination information storage section accumulating and storing preference discrimination information in which information related to evaluation of content input to the terminal by a user and identification information of the user are associated with each other, a content feature information storage section storing content feature information in which data indicating features of content are associated with identification information of content, a preference information creation section creating preference information of each user by integrating evaluation for content with the feature of the content for each user based on the preference discrimination information and the content feature information, and a recommended content list providing section transmitting a list of recommended content, extracted by evaluating the degree of similarity of features with the preference information based on the content feature information, to the terminal.

20 Claims, 10 Drawing Sheets

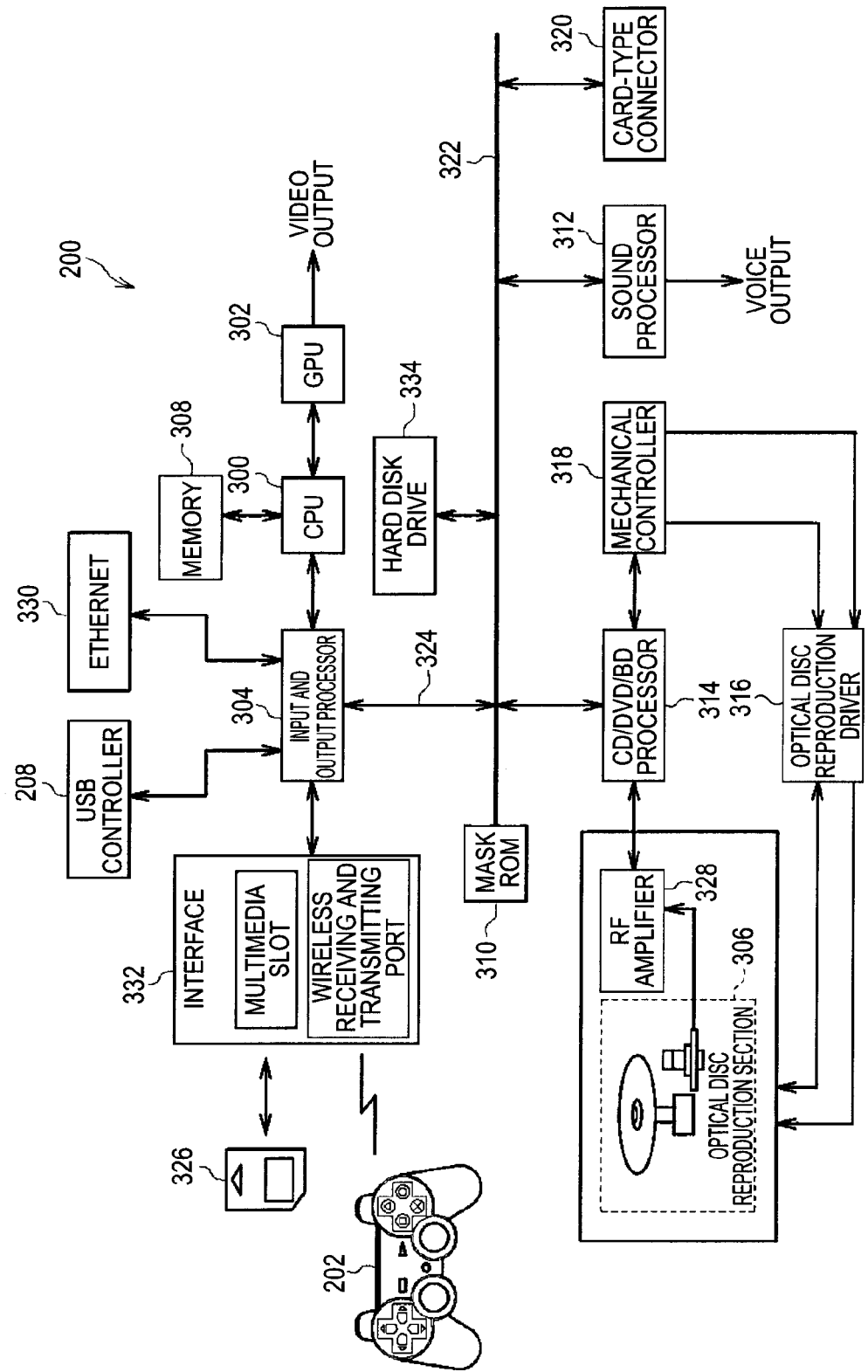

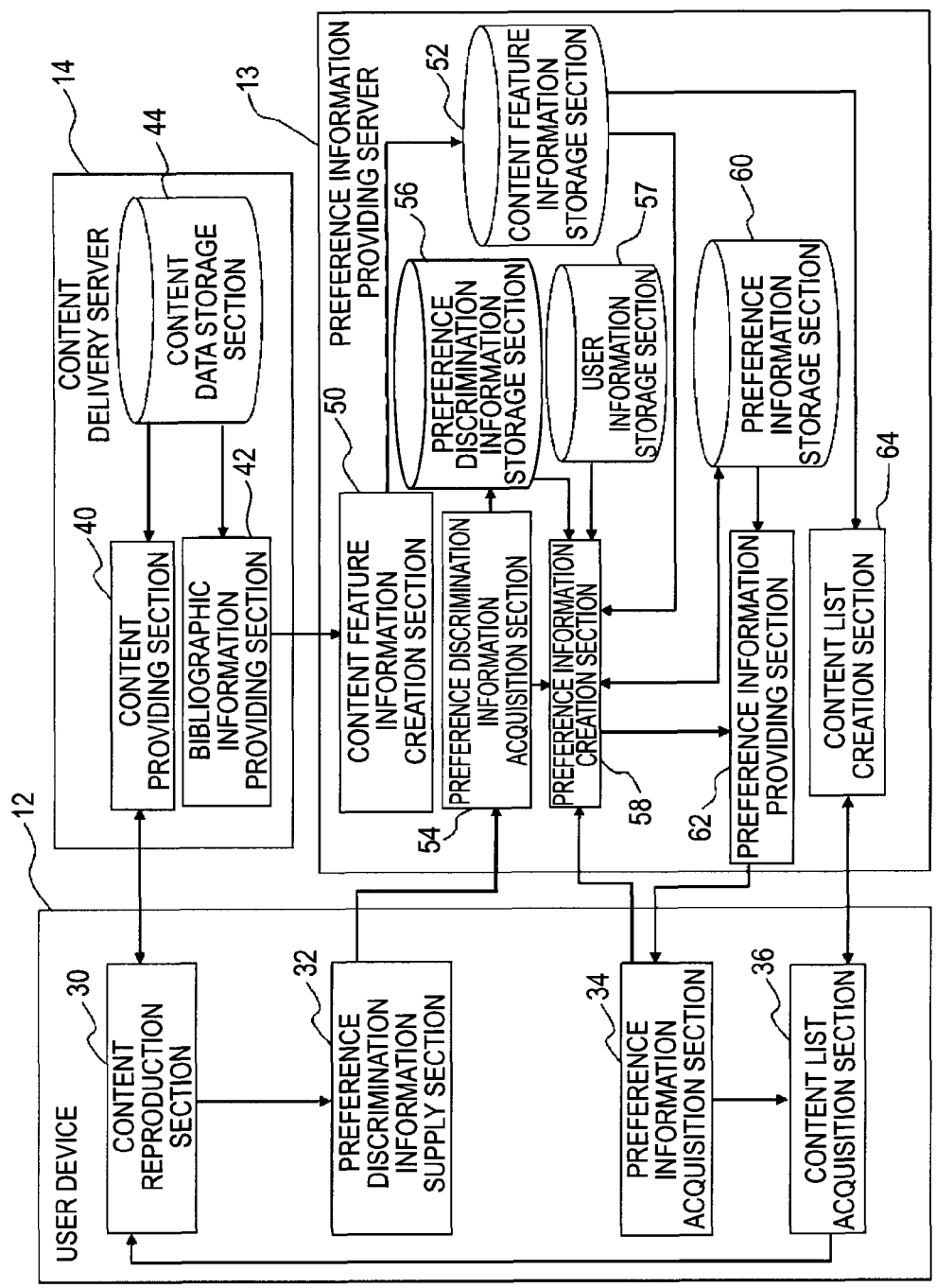

FIG.6

| MUSICAL COMPOSITION ID | GENRE | SMALL GENRE | ARTIST | DATE | RELATED ARTIST | MELODY |
|---|---|---|---|---|---|---|
| 001 | ROCK | HARD ROCK | A | 1980 | B | AGITATO |
| 002 | POP | J-POP | C | 1990 | D | BOUNCY |

FIG.7

| MUSICAL COMPOSITION ID | FEATURE 1 | FEATURE 2 | FEATURE 3 | ..... | FEATURE M |
|---|---|---|---|---|---|
| 001 | 0.1 | 0.2 | 0.3 | ..... | 0.1 |
| 002 | 0.8 | 0.0 | 0.0 | ..... | 0.2 |

FIG.8

| USER ID | MUSICAL COMPOSITION ID | EVALUATION | EVALUATION DATE AND TIME |
|---|---|---|---|
| 0001 | 004 | LIKE | 2010.02.08 |
|  | 012 | DISLIKE | 2010.02.08 |
|  | 009 | LIKE | 2010.02.10 |
| 0002 | 012 | DISLIKE | 2010.05.30 |
|  | 022 | LIKE | 2010.07.10 |
|  | 006 | LIKE | 2010.07.10 |

FIG.9

| USER ID | AGE | CITY OF RESIDENCE | LANGUAGE |
|---|---|---|---|
| 0001 | 28 | TOKYO | JAPANESE |
| 0002 | 32 | OSAKA | ENGLISH |
| 0003 | 18 | FUKUOKA | JAPANESE |

CONTENT RECOMMENDATION SYSTEM, CONTENT RECOMMENDATION DEVICE, AND CONTENT RECOMMENDATION METHOD

FIELD

The present disclosure relates to an information processing technique, and specifically to a content recommendation system that recommends content to a user, a content recommendation device, and a content recommendation method.

BACKGROUND

In recent years, using communication networks such as the Internet desired content has been enjoyed from an enormous amount of content. Since available content amounts to an enormous quantity, various types of recommendation techniques have also been proposed. For example, there is a technique for retrieving user's favorite types of content, and presenting the content to a user (see, for example, JP-A-2006-58947). On the other hand, a technique of content-based filtering has also been proposed for detecting content having feature information with a high similarity to feature information of a user's favorite content.

SUMMARY

The above-mentioned technique is to search each time for content matching with a keyword input from a user. In this case, there is a problem from the viewpoint of content recommendation suitable to the preferences of the user, since there is often a state in which the retrieval range becomes restricted due to the setting of bibliographic information of content to a keyword, and content which is detected is different from the user's intention due to vague keywords.

A recommendation technique using content-based filtering is a field having a possibility of development in the future, besides current proposed techniques. However, as arithmetic operations grow more complex, the processing load becomes larger. In addition, an enormous amount of metadata related to content is necessary. For example, it is difficult to easily perform selection of content using devices having relatively scarce processing capabilities or resources, such as portable audio players or cellular phones.

Thus, it is desirable to provide an information processing technique capable of realizing content recommendation, having a high level of accuracy, which matches a user's preference or desire irrespective of the current environment of the user.

According to an embodiment of the present disclosure, there is provided a content recommendation system including: a client terminal operated by a user; and a content recommendation server that recommends content to the client terminal through a network, wherein the content recommendation server includes a preference discrimination information storage section that accumulates and stores preference discrimination information in which information related to evaluation of content input to the client terminal by a user and identification information of the user are associated with each other, a content feature information storage section that stores content feature information in which data indicating features of content are associated with identification information of content; a preference information creation section that creates preference information of each user by integrating evaluation for content with the feature of the content for each user on the basis of the preference discrimination information and the content feature information; and a recommended content list providing section that transmits a list of recommended content, extracted by evaluating the degree of similarity of features with the preference information on the basis of the content feature information, to the client terminal.

According to another embodiment of the present disclosure, there is provided a content recommendation device, connected to a plurality of client terminals through a network, that recommends content to each client terminal, including: a preference discrimination information storage section that accumulates and stores preference discrimination information in which information related to evaluation of content input to the client terminal by a user and identification information of the user are associated with each other; and a recommended content list providing section that compares combinations of content to be evaluated by the same user for each user with reference to the preference discrimination information, evaluates the level of relevance between content items of the combination by the number of users evaluating the same combination, then creates a list of recommended content by reflecting the evaluation result to extraction processing of recommend content, and transmits the list to the client terminal.

According to still another embodiment of the present disclosure, there is provided a content recommendation method of allowing a recommendation server to recommend content to a client terminal operated by a user through a network, including: accumulating preference discrimination information, in which information related to evaluation of content input to the client terminal by a user and identification information of the user are associated with each other, in the recommendation server, and storing the preference discrimination information in a memory; referring to content feature information, in which data indicating features of content are associated with identification information of content, from a database that stores the content feature information; creating preference information of each user by integrating evaluation for content in the preference discrimination information and features of the content in the content feature information for each user; and transmitting a list of recommended content, extracted by evaluating the degree of similarity of features with the preference information on the basis of the content feature information, to the client terminal.

Meanwhile, arbitrary combinations of the above-mentioned components, and ones obtained by conversion of the expression of the present disclosure among methods, devices, systems, computer programs, recording mediums having the computer programs recorded thereon, and the like are also effective as an embodiment of the present disclosure.

According to the present disclosure, it is possible to recommend content matching a desire of a user in a variety of environments.

BRIEF DESCRIPTION OF THE DRAWINGS

FIG. 4 is a diagram illustrating an internal circuit configuration of a game machine in the computer game system of FIG. 3.

FIG. 5 is a functional block diagram of the user device, the preference information providing server, and the content delivery server in the embodiment.

FIG. 6 is a diagram illustrating an example of bibliographic information of musical compositions stored in a content data storage section of the content delivery server in the embodiment.

FIG. 7 is a diagram illustrating an example of content feature information stored in a content feature information storage section of the preference information providing server in the embodiment.

FIG. 8 is a diagram illustrating an example of preference discrimination information stored in a preference discrimination information storage section of the preference information providing server in the embodiment.

FIG. 9 is a diagram illustrating an example of user information stored in a user information storage section of the preference information providing server in the embodiment.

DETAILED DESCRIPTION

Figure 1:
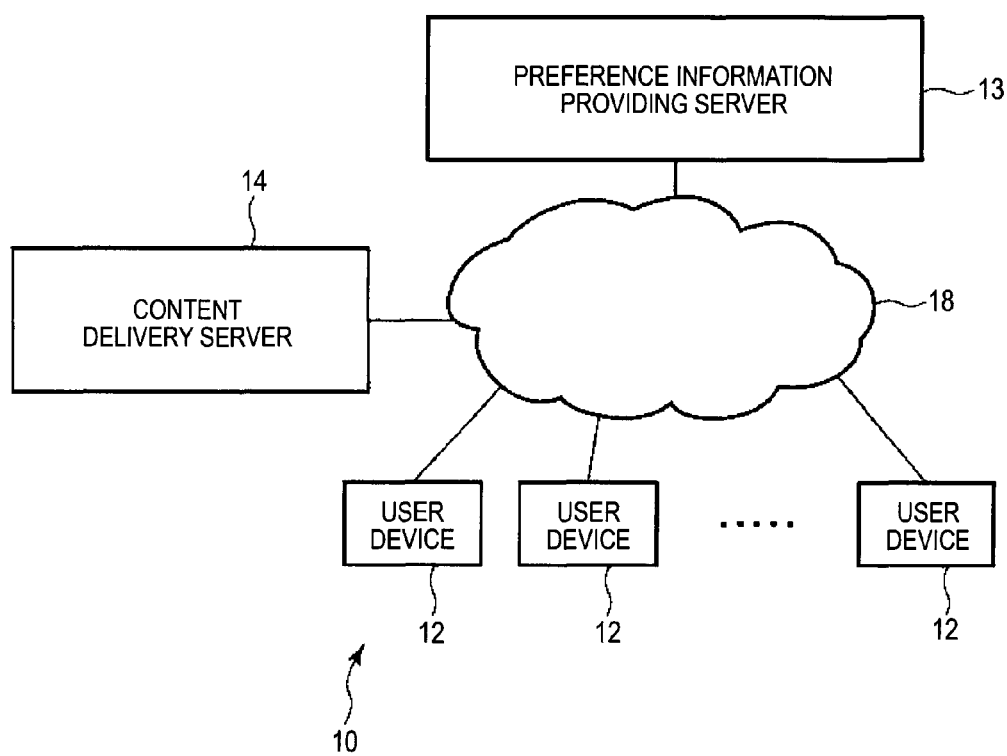
FIG. 1 is an overall configuration diagram of a content recommendation system according to an embodiment.

FIG. 1 is an overall configuration diagram of a content recommendation system according to an embodiment. As shown in the same drawing, a content recommendation system 10 includes a preference information providing server 13, a content delivery server 14, and a plurality of user devices 12, connected to a data communication network 18 such as the Internet, which are capable of performing data communication with each other.

The user device 12 is, for example, a computer system such as a personal computer, a computer game system, and a home server which are installed in each home, or a transportable computer system such as a portable game machine or a cellular phone, and has access to the preference information providing server 13 to receive preference information and a list of recommended content that the user of the user device 12 may desire to obtain. The user device requests data of the content included in the list from the content delivery server 14, and receives the data to perform reproduction or execution thereof.

On the other hand, the preference information providing server 13 includes, for example, a computer system such as a server computer according to the related art, and collects preference discrimination information, which is evaluation of the user with respect to the content, from each of the user devices 12, to derive preference information of the user on the basis of the preference discrimination information. In addition, the preference information providing server 13 provides a list of content recommended to the user on the basis of the preference information. Here, the term "preference information" is information in which preference of the user of the user device 12 which is a requestor, or preference of another user is evaluated by specific items and entered into a database. Though a specific example of the preference information will be described later in detail, the term "preference" is naturally different for different individuals, and further varies with time or circumstances and the like. The preference information providing server 13 derives the preference information in consideration of changes in such various preferences, and makes a list of and transmits content having a high degree of similarity with this, to thereby recommend appropriate content to the user of the user device 12.

The content delivery server 14 transmits data of the individual content in response to the request from each of the user devices 12. Here, the term "content" is not particularly limited to the types of musical compositions, moving pictures such as movies, still images such as photographs, character media such as novels, applications such as games, and the like. In the embodiment, cross-media recommendation in which the types of content are not limited is realized, for example, a game may be recommended from preference information of a musical composition in response to the request from the user of the user device 12.

Figure 2:
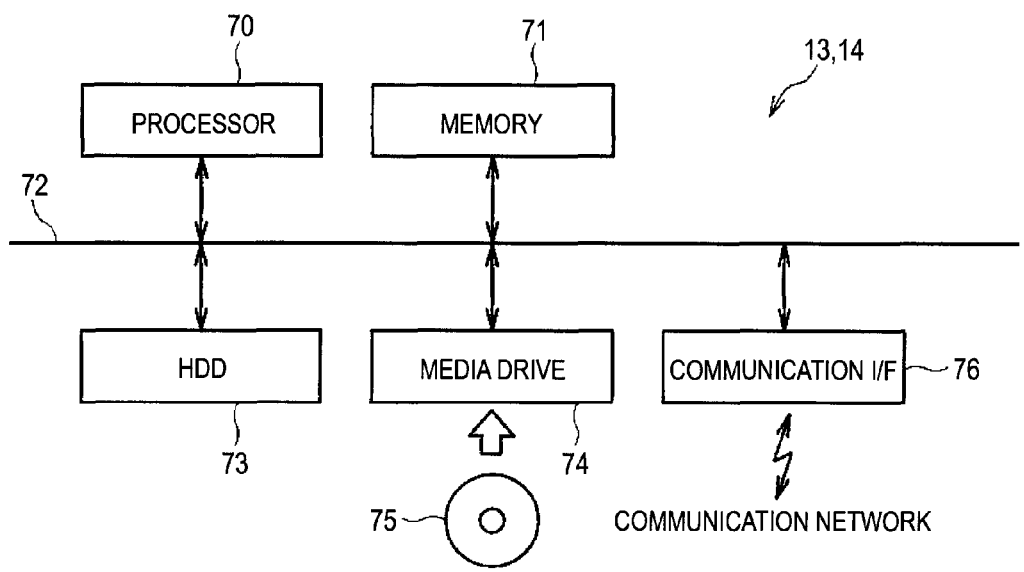
FIG. 2 is a diagram illustrating a hardware configuration example of a preference information providing server and a content delivery server in the embodiment.

FIG. 2 is a diagram illustrating a hardware configuration example of the preference information providing server 13 and the content delivery server 14. As shown in the same drawing, the preference information providing server 13 and the content delivery server 14 include a processor 70, a memory 71, a hard disk drive 73, a media drive 74, and a communication interface 76, and these components are connected to a bus 72 and are configured so as to interchange data with each other. The memory 71 includes a ROM and a RAM. The ROM stores various types of system programs, and the RAM is mainly used for operations of the processor 70.

On the hard disk drive 73, a program for providing the preference information or a recommended content list or delivering the content is stored, and various types of databases for providing the preference information or delivering the content are established. The media drive 74 is a unit that reads out data stored in a computer readable medium 75 such as a CD-ROM or a DVD-RAM, or writes data to the medium. The communication interface 76 is a unit that controls data communication of the preference information providing server 13 or the content delivery server 14 with another computer system through the data communication network 18. In addition, the processor 70 is a unit that controls each section of the server in accordance with the program stored in the memory 71, the hard disk drive 73 or the computer readable medium 75.

Figure 3:
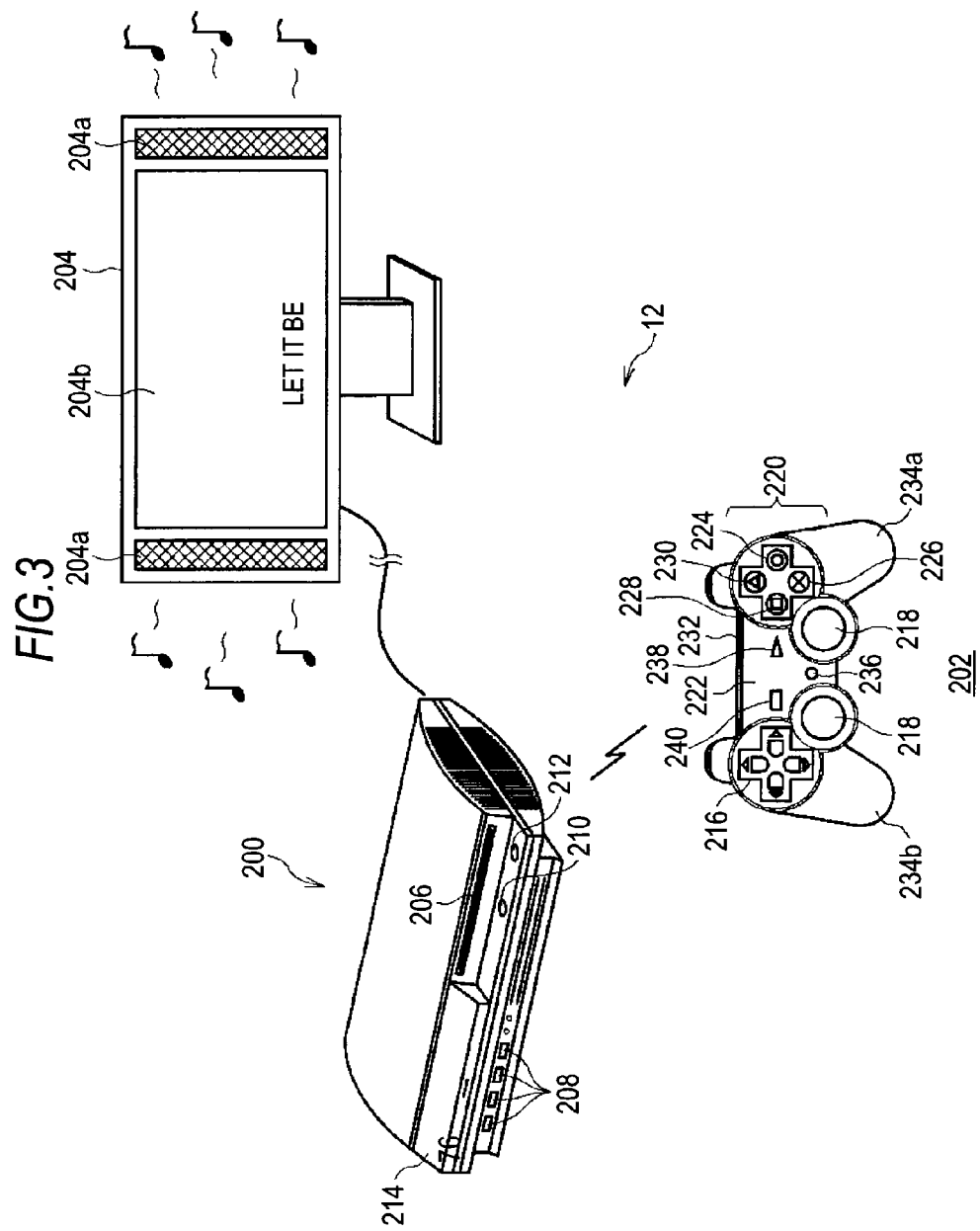
FIG. 3 is an appearance diagram of a computer game system used as a user device in the embodiment.

Next, the user device 12 will be described in detail. FIG. 3 is an appearance diagram of a computer game system used as the user device 12. This computer game system includes a game machine 200, an operation device 202, and a TV monitor 204. The game machine 200 is a computer game system, and executes not only game programs, but also various types of programs such as a web browser and a reproduction program for movies or music. The programs may be read from various types of computer readable mediums such as various types of optical discs, internal or external hard disk drives, and semiconductor memories, or may be downloaded through a communication network such as the Internet. The operation device 202 is connected to the game machine 200 in a wireless or wired communication manner.

The game machine 200 includes a disc insertion slot 206 corresponding to an optical disc or USB connection terminals 208. The optical disc such as a BD (Blu-ray Disc (trademark)), a DVD-ROM, or a CD-ROM is inserted into the disc insertion slot 206. A touch sensor 210 is used in order to instruct the game machine 200 to eject a disc, and a touch sensor 212 is used in order to instruct the game machine 200 to turn a power supply on/off. The back side of the game machine 200 is provided with a power supply switch, a music and image output terminal, an optical digital output terminal, an AC power supply terminal, a LAN connector, and an HDMI terminal (all not shown).

The game machine 200 also includes a multimedia slot for receiving many types of removable semiconductor memory. When a cover 214 provided to the front of the game machine 200 is opened, a plurality of slots, not shown, for receiving each different type of semiconductor memory appears.

The operation device 202 is driven by a battery which is not shown in the drawing, and includes a plurality of buttons or keys used for the user to perform operation input. When the user operates the buttons or the keys of the operation device 202, the details of the operation are transmitted to the game machine 200 in a wireless or wired manner.

The operation device 202 is provided with a direction key 216, a joystick 218, and an operation button group 220. The direction key 216, the joystick 218, and the operation button group 220 are provided to a front casing 222. In four kinds of operation buttons 224, 226, 228 and 230, different figures are inscribed on the tops thereof in different colors so as to distinguish one from the others. That is, a red circular mark is inscribed on the operation button 224, a blue cross mark is inscribed on the operation button 226, a purple square mark is inscribed on the operation button 228, and a green triangular mark is inscribed on the operation button 230. Meanwhile, a rear casing 232 of the operation device 202 is provided with a plurality of LEDs (not shown).

The user grips a left grip portion 234b with the left hand and grips a right grip portion 234a with the right hand, to operate the operation device 202. The direction key 216, the joystick 218 and the operation button group 220 are provided to the front casing 222 so that the user can operate them in the state where the left grip portion 234b and the right grip portion 234a are gripped with both hands.

The front casing 222 is also provided with an LED-fitted button 236. The LED-fitted button 236 is used as, for example, a button for displaying a specific menu screen on a TV monitor 204 using the game machine 200. In addition, the LED-fitted button has a function of indicating the state of the battery of the operation device 202 depending on the light-emitting state of the LED. For example, the button is lighted up in red during charging, lighted up in green when fully charged, and flickered in red when the residual amount of charge is small.

The direction key 216 is configured to be capable of performing key-in in four directions of the top, bottom, left and right, or in eight directions obtained by adding four directions between these four directions to the top, bottom, left and right, or in any direction, and is used to, for example, move a cursor to the top, bottom, left and right on the screen of the TV monitor 204, or scroll various types of information on the screen. Each different function is allocated to the operation button group 220 by an application program.

The joystick 218 includes a stick which is tiltably supported in any direction, and a sensor which detects the amount of tilt. The stick is biased to a neutral position by a biasing unit such as a spring, and the stick returns to the neutral position when it is not operated. The sensor includes a variable resistor that varies a resistance value in accordance with the tilt of the stick and an AD converter circuit that converts the resistance value into a digital value. When the stick is tilted, the amount of tilt in a plurality of reference directions is converted into a digital value, and the value is sent to the game machine 200 as an operation signal.

The operation device 202 also includes a selection button 240 and a start button 238. The start button 238 is used, for example, for the user to give an instruction to start a program, or to perform starting or pausing of reproduction of a movie or music. On the other hand, the selection button 240 is used, for example, for the user to select any one of the menu items displayed on the TV monitor 204.

Here, the internal circuit configuration of the game machine 200 will be described. As shown in FIG. 4, the game machine 200 includes a main CPU 300, a GPU (graphic processing unit) 302, an input and output processor 304, an optical disc reproduction section 306, a main memory 308, a mask ROM 310, and a sound processor 312, as the basic configuration. The main CPU 300 performs signal processing or control of the internal configuration on the basis of various types of programs. The GPU 302 performs image processing. The input and output processor 304 executes interface processing between a portion of elements outside the device or elements within the device and the main CPU 300. Furthermore, it may be configured so that the input and output processor 304 has a function of executing the application program, and the game machine 200 is compatible with another game machine.

The optical disc reproduction section 306 reproduces an optical disc such as a BD, a DVD-ROM, and a CD-ROM on which the application program or multimedia data are recorded. The main memory 308 functions as a buffer for temporarily storing data read out from the work area of the main CPU 300 or the optical disc. The mask ROM 310 stores an operating system program executed mainly by the main CPU 300 or the input and output processor 304. The sound processor 312 processes a voice signal.

In addition, the game machine 200 also includes a CD/DVD/BD processor 314, an optical disc reproduction driver 316, a mechanical controller 318, a hard disk drive 334, and a card-type connector (for example, PC card slot) 320. The CD/DVD/BD processor 314 performs processing such as, for example, error correction processing (for example, CIRC (Cross Interleave Reed-Solomon Coding) processing) or extension decoding processing with respect to a disc reproduction signal which is read out from the CD/DVD/BD by the optical disc reproduction section 306 and is amplified by a RF amplifier 328, to thereby reproduce data recorded on these CD/DVD/BD. The optical disc reproduction driver 316 and the mechanical controller 318 perform processing such as the rotation control of a spindle motor of the optical disc reproduction section 306, the focus/tracking control of the optical pickup, the loading control of the disc tray, and the like.

The hard disk drive 334, for example, stores a program or saves data of a game program read out in the optical disc reproduction section 306, or stores data such as photographs, moving images, and voices acquired through the input and output processor 304. The card-type connector 320 is, for example, a connection port of a communication card or an external hard disk drive.

These internal elements are mainly connected to each other through bus lines 322 and 324, respectively. Meanwhile, the main CPU 300 and the GPU 302 are connected to each other through a dedicated bus. In addition, the main CPU 300 and the input and output processor 304 are connected to each other through a high-speed BUS. The input and output processor 304 and the CD/DVD/BD processor 314, the mask ROM 310, the sound processor 312, the card-type connector 320, and the hard disk drive 334 are also similarly connected to each other through a high-speed BUS.

The main CPU 300 controls the operation of the game machine 200 by executing an operating system for the main CPU 300 which is stored in the mask ROM 310. Moreover, data in addition to various types of programs are read out from the optical disc such as a BD, a DVD-ROM, and a CD-ROM and are loaded to the main memory 308. In addition, a program loaded to the main memory 308 is executed. Alternatively, data in addition to various types of programs are downloaded through a communication network, and the downloaded program is executed.

The input and output processor 304 executes an operating system program for the input and output processor stored in the mask ROM 310, to thereby control the input and output of data to and from the operation device 202, a memory card 326, the USB connection terminal 208, Ethernet (registered trademark) 330, and an IEEE 1394 terminal or a PC card slot which are not shown in the drawing. Meanwhile, the input and output control of data to and from the operation device 202 or the memory card 326 is performed through an interface 332 including a multimedia slot and a wireless receiving and transmitting port.

The GPU 302 has a function of a geometry transfer engine that executes processing such as coordinate transformation and a function of a rendering processor, and draws an image to a frame buffer, not shown, in accordance with a drawing instruction from the main CPU 300. For example, when the program recorded on the optical disc is a program that uses 3D graphics, the GPU 302 calculates coordinates of polygons forming a three-dimensional object by the geometry operation. In addition, an image to be obtained by taking an image of the three-dimensional object using a virtual camera is generated by the rendering processing. The image obtained in this way is stored in the frame buffer, and the GPU 302 outputs a video signal corresponding to the stored image to the TV monitor 204. In this way, the image is displayed on a screen 204b of the TV monitor 204.

The sound processor 312 includes an ADPCM (Adaptive Differential Pulse Code Modulation) decoding function, an audio signal regeneration function, and a signal modulation function. The ADPCM decoding function is a function of generating waveform data from ADPCM-decoded sound data. The audio signal regeneration function is a function of generating an audio signal such as a sound effect from waveform data stored in a sound buffer which is built in the sound processor 312 or provided separately from the sound processor 312. A sound represented by the audio signal is output from built-in speakers 204a and 204a of the TV monitor 204. The signal modulation function is a function of modulating the waveform data stored in the sound buffer.

In the game machine 200, when the power supply is turned on, the operating system programs for the main CPU 300 and for the input and output processor 304 are read out from the mask ROM 310. The main CPU 300 and the input and output processor 304 executes each of the operating system programs. Thereby, the main CPU 300 controls each section of the game machine 200 as a whole. In addition, the input and output processor 304 controls the input and output of signals to and from elements such as the operation device 202 or the memory card 326.

In addition, when the operating system program is executed, the main CPU 300 first performs initialization processing such as operation confirmation. Subsequently, after the optical disc reproduction section 306 is controlled to read out an application program such as a game stored on the optical disc, the program is loaded to the main memory 308, and then is executed. By execution of the program, the main CPU 300 controls the GPU 302 or the sound processor 312 in accordance with an instruction of the user received from the operation device 202 through the input and output processor 304, and controls display of the image or the sound effect, and generation of a musical sound.

The user device 12 can be realized by a device having various configurations as mentioned above, besides the computer game system shown in FIGS. 3 and 4. A specific configuration example will be described later.

FIG. 5 is a functional block diagram of the user device 12, the preference information providing server 13, and the content delivery server 14. As shown in the same drawing, the user device 12 includes a content reproduction section 30, a preference discrimination information supply section 32, a preference information acquisition section 34, and a content list acquisition section 36. A program for realizing these elements, for example, is read out from the optical disc by the optical disc reproduction section 306, and is installed on the hard disk drive 334. Alternatively, the program may be downloaded from another computer on a communication network through the Ethernet 330.

The preference information providing server 13 includes a content feature information creation section 50, a content feature information storage section 52, a preference discrimination information acquisition section 54, a preference discrimination information storage section 56, a user information storage section 57, a preference information creation section 58, a preference information storage section 60, a preference information providing section 62, and a content list creation section 64. The content delivery server 14 includes a content providing section 40, a bibliographic information providing section 42, and a content data storage section 44. These elements included in the preference information providing server 13 and the content delivery server 14 can also be realized by the program, executed by the processor 70, which is stored on the hard disk drive 73.

The content reproduction section 30 of the user device 12 receives the input instructed from the user and reproduces content. Here, content acquired by transmitting a content list, supplied from the content list acquisition section 36, to the content delivery server 14 is also included in the content to be reproduced. Meanwhile, the "reproduction" performed by the content reproduction section 30 is equivalent to "execution" in the case of the game application, and appropriately varies with the type of content.

The preference discrimination information supply section 32 transmits evaluation of the user for the content, which is reproduced or has been reproduced in the content reproduction section 30, to the preference information providing server 13 as preference discrimination information. The preference discrimination information is information which is related to likes and dislikes of the user for target content, and becomes a source for creating preference information of the user. For example, when content during reproduction is agreeable, the user inputs a positive evaluation by pressing down a specific button (for example, button 224) of the operation device 202. Conversely, when content during reproduction is not agreeable, the user inputs a negative evaluation by pressing down another button (for example, button 226) of the operation device 202.

General inputs related to the content reproduction of the user, that is, instruction inputs such as reproduction, fast-forward, and pause may be set to the preference discrimination information. For example, a case where the content is reproduced to the end may be set to a positive evaluation input, and a case where the content is paused may be set to a negative evaluation input. In addition, an evaluation input screen may be displayed on the TV monitor 204 so as to be capable of performing stepwise evaluation.

The preference discrimination information supply section 32 transmits the preference discrimination information input in this way to the preference information providing server 13 together with identification information of the content to be evaluated. The identification information of the content is information for identifying a large number of each of the content items delivered to the user by the content recommendation system 10, and is shared by the user device 12, the preference information providing server 13, and the content delivery server 14.

The preference information acquisition section 34 requests the preference information from the preference information providing server 13, and acquires the preference information transmitted as a result of the request. The requested preference information may be, for example, preference information of the user themselves who is a requestor, based on the preference discrimination information transmitted to the preference information providing server 13 by the preference discrimination information supply section 32, and may be preference information of another user. Here, another user may be a specific person designated by the user, and may be a person, suitable for features designated by the user, who has an area of residence, sex, age range, occupation, and similar preferences, or a set of persons.

The content list acquisition section 36 requests the content list from the preference information providing server 13, and acquires the content list transmitted as a result of the request. When requesting the content list, the content list acquisition section 36 creates request data in which the filtering conditions at the time of creating the content list are added to the preference information acquire by the preference information acquisition section 34 and then transmits the request data to the preference information providing server 13. The content list transmitted from the preference information providing server 13 is supplied to the content reproduction section 30.

The content data storage section 44 of the content delivery server 14 is a database for storing a content data body and each item of bibliographic information. The content providing section 40 reads out the corresponding content data from the content data storage section 44 on the basis of the content list transmitted from the user device 12 to transmit them to the user device 12. The bibliographic information providing section 42 transmits the bibliographic information for each item of content to the preference information providing server 13. The transmission of the bibliographic information is performed basically at a point in time where the system is established and the content data are stored in the content data storage section 44. However, after that, whenever new content is added to the content data storage section 44, the bibliographic information of the added content is transmitted.

The content feature information creation section 50 of the preference information providing server 13 creates content feature information from the bibliographic information of the content which is transmitted from the content delivery server 14, and stores it in the content feature information storage section 52. The content feature information is information indicating the features of the content in the same format as that of the preference information of the user so as to be capable of deriving the degree of similarity to the preference information of the user. A specific example thereof will be described later. The content feature information storage section 52 is a database for storing information in which the identification information of the content and the content feature information are associated with each other.

The preference discrimination information acquisition section 54 acquires the preference discrimination information, which is an evaluation of the user for the content, from the user device 12, and stores it in the preference discrimination information storage section 56. The preference discrimination information storage section 56 is a database in which information of association of the identification information of the content, the evaluation result, and the date and time of the evaluation with each other is associated with the identification information of the user to accumulate and store the result thereof. The user information storage section 57 is a database in which the identification information of the user is associated with the attributes of the user, for example, a place of residence, sex, occupation, age, and the like to store the results thereof. The database is established by acquiring items input to the user device 12 by the user at the time of initial use of the services provided by the content recommendation system 10.

The preference information creation section 58 creates the preference information when the preference discrimination information acquisition section 54 acquires new preference discrimination information from the user device 12, or receives a request for the preference information from the user device 12. Basically, the preference information is created for each user from the preference discrimination information. However, the user sets suitable for specific conditions are first created in accordance with the request for the preference information, and then the preference information of the user sets is created on the basis of the preference discrimination information of the user belonging to the corresponding set.

The preference information creation section 58 for creating the preference information first reads out the preference discrimination information of the target user from the preference discrimination information storage section 56. The identification information of each item of content of a group of content items to which the positive evaluation is given and a group of the content items to which the negative evaluation is given is respectively read out from the readout preference discrimination information. Next, the feature information of the corresponding content is read out from the content feature information storage section 52 on the basis of the corresponding identification information, and is synthesized for each group. Thereby, it is possible to create the preference information indicating the features of the content considered positively by a certain user and the preference information indicating the features of the content considered negatively by the user.

The created preference information is stored in the preference information storage section 60. The preference information storage section 60 is a database in which the user or the user set is associated with the preference information to store the result thereof. The preference information providing section 62 reads out the preference information, matching a request from the user device 12, from the preference information storage section 60 in response to the request, and transmits it to the user device 12 which is a requestor. Meanwhile, the preference information providing section 62 may receive the preference information directly from the preference information creation section 58 to transmit it to the user device 12 which is a requestor.

The content list creation section 64 receives the request of the content list from the user device 12, creates the content list and then transmits it to the user device 12. At this time, content suitable for the filtering conditions from the content having the preference information and the feature information with a high degree of similarity is extracted from the content feature information storage section 52 with reference to the preference information included in the request data created by the user device 12 and the filtering conditions, and a content list is set by making a list of the identification information.

Next, a specific example of each information item generated and processed in the embodiment is shown with respect to the case where the content is a musical composition. FIG. 6 shows an example of bibliographic information of musical compositions stored by the content data storage section 44 of the content delivery server 14. The bibliographic information of the musical compositions is information in which musical composition IDs which are identification information of the musical compositions and bibliographic information thereof are associated with each other. As the bibliographic information, in the same drawing, a plurality of information items is prepared suitable for indicating the features of each musical composition such as a genre of the musical composition, a small genre indicating small classification in the genre, the artist name of the singer or the player and the like of the musical composition, the date when the musical composition was released, related artists having an affected artist name or an intimate artist name, and the melody of the musical composition.

For example, as genres, rock, pop, classic, jazz, and the like are mentioned, and as the date, the 1950s, 1960s, 1970s, and the like are mentioned. Meanwhile, the bibliographic information may be input as a result of analysis processing through a computer with respect to a portion of information such as a melody, besides using information input manually at a time of content creation or circulation and the like.

FIG. 7 shows an example of content feature information stored by the content feature information storage section 52 of the preference information providing server 13. The content feature information is information in which the musical composition ID and the feature information thereof are associated with each other. The feature information is, for example, information in which predetermined items (displayed as "feature 1", "feature 2", . . . in the same drawing) such as the tempo of the musical composition, the level at which the musical composition includes sound of a specific frequency, and the frequency at which specific keywords are included in expository texts of the musical composition are evaluated for each item of content, and are digitized as the feature amount.

The feature amount may be input as a result of analysis processing through a computer. Such a set of the feature amount is used for evaluation of the degree of similarity to the preference information, whereby it is possible to regard the set as a vector of the number of features within a multidimensional space. In what follows, a vector using the feature amount of each feature as a component is referred to as a feature vector. As the feature information, the type of content and the bibliographic information for use in filtering at the time of creating a content list may be further included. They may be digitized and included in the feature vector, and may be stored as a character string.

FIG. 8 shows an example of preference discrimination information stored by the preference discrimination information storage section 56 of the preference information providing server 13. The preference discrimination information is information in which the musical composition ID, the evaluation of the musical composition by the user, and the evaluation date and time are associated with each other for each user ID which is identification information of the user. For example, the user of the user ID "0001" acquires information in which the musical composition ID "004" is evaluated as "like" on "Feb. 8, 2010" from the user device 12, and stores the information in the preference discrimination information storage section 56.

Even when the same user requests the preference information or the content list using another user device 12, by storing the preference discrimination information for each user in this way, the same information can be acquired regardless of the processing capability of the user device 12. Meanwhile, the preference information providing server 13 may transmit a portion of the preference discrimination information, shown in the same drawing, to the user device 12 in response to the request of the user. Thereby, the user acquires, for example, the identification information of a musical composition evaluated as "like" by the user in another user device 12, a musical composition evaluated as "like" in the past, or a musical composition evaluated by another user, and thus can apply the identification information to selecting the musical composition to be reproduced.

FIG. 9 shows an example of user information stored by the user information storage section 57 of the preference information providing server 13. The user information is information in which the user ID and the attributes of the user such as age, city of residence, and language are associated with each other. For example, the user of the user ID "0001" acquires information that his/her age is "28", city of residence is "Tokyo", and language is "Japanese" from the user device 12 at the time of registration of the information by the user, and the information is stored by the user information storage section 57.

Figures 10, 11:
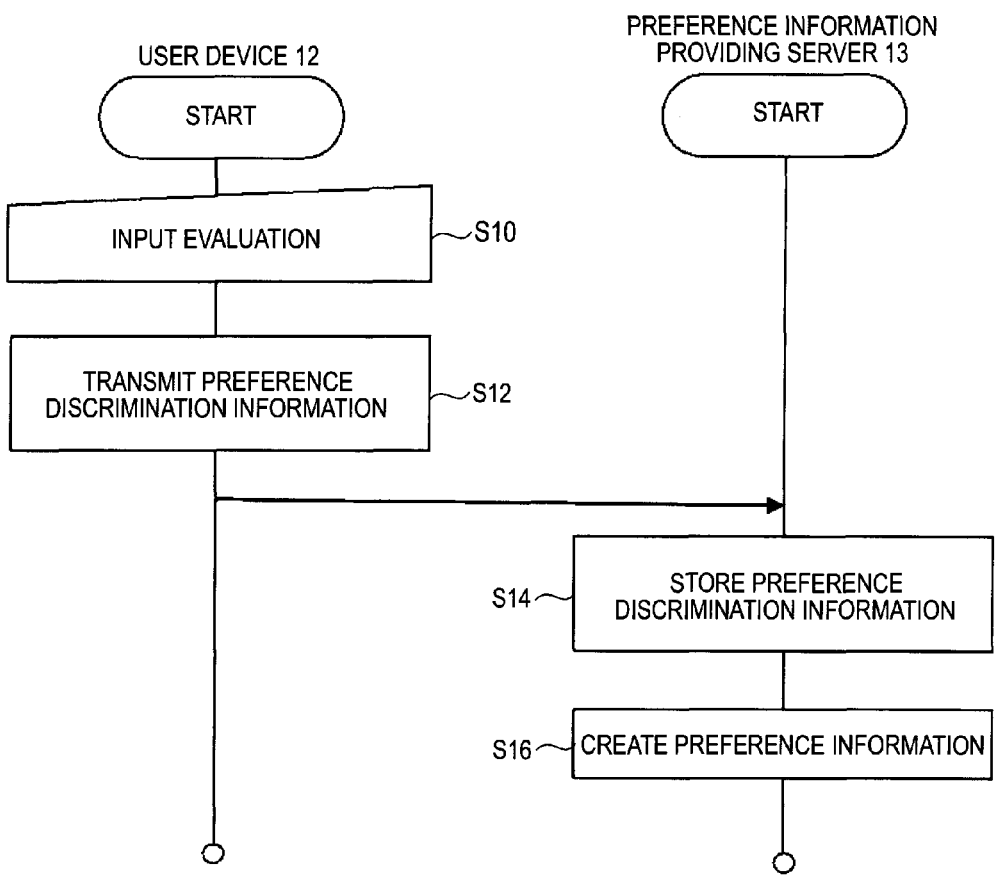
FIG. 10 is a diagram illustrating an example of preference information stored in a preference information storage section of the preference information providing server in the embodiment.
FIG. 11 is an operation sequence diagram of the content recommendation system in the embodiment.

FIG. 10 shows an example of preference information stored by the preference information storage section 60 of the preference information providing server 13. In the preference information, the user ID and a preference vector which is the preference information of the user are associated with each other. The preference vector is derived by synthesizing feature vectors of a content group on which the same evaluation is made by each user. For example, the identification information of the content evaluated as "like" by the user of the user ID "0001" is extracted from the preference discrimination information as shown in FIG. 8, and the feature vectors of the corresponding content are read out from the content feature information as shown in FIG. 7. The preference vector evaluated as "like" by the user of the user ID "0001" is obtained by synthesizing a plurality of readout feature vectors.

The creation of the preference vector may be performed at a point in time where the preference information is requested from the user device 12, and may be updated by modifying the preference vector of the corresponding user in accordance with new preference discrimination information, whenever the preference discrimination information is supplied from the user device 12. In the latter case, the stored preference vector is based on all the evaluations, which has been performed in the past, including the latest evaluation. Meanwhile, in the same drawing, for the purpose of easy understanding, the preference vectors of "like" and "dislike" are indicated one by one as the preference information with respect to one user. However, in the embodiment, it is possible to expand the range of information capable of being provided by creating various preference vectors.

For example, the preference vectors may be created for each environmental type at the time of the evaluation by period, time slot, location, type of the user device 12, and the like in which the content is evaluated. In this case, information of the evaluation time, the evaluation location, the type of the user device, and the like, including the preference discrimination information, is transmitted from the user device 12, and the transmitted information is stored in the preference discrimination information storage section 56. The identification information of the content evaluated in each environmental type is extracted, and the preference vectors are derived for each type on the basis of the feature information of the content.

In addition, one preference vector may be created with the corresponding user set by synthesizing the preference vector of a plurality of users. The user set can be formed on the basis of the attributes of the user stored by the user information storage section 57. For example, the corresponding user ID is extracted by the age range of users such as 10s, 20s and the like, occupation, and area of residence, and the preference vectors of the users are synthesized for each attribute. Alternatively, the past evaluation histories are acquired from the preference discrimination information stored in the preference discrimination information storage section 56, and the user set may be formed by extracting the users who give the same evaluation to the same content.

Besides forming the user set by the users having completed matched attributes or similar evaluation, the user set may be formed by clustering the user close to a portion of data of the preference discrimination information or the preference information using a statistical method such as a k-means method. When the preference information regarding the user set is created, the user ID in the preference information of FIG. 10 becomes identification information of the user set. The preference vectors for each environmental type at the time of the evaluation or the preference vectors of the user set may be combined anyway.

Figure 12:
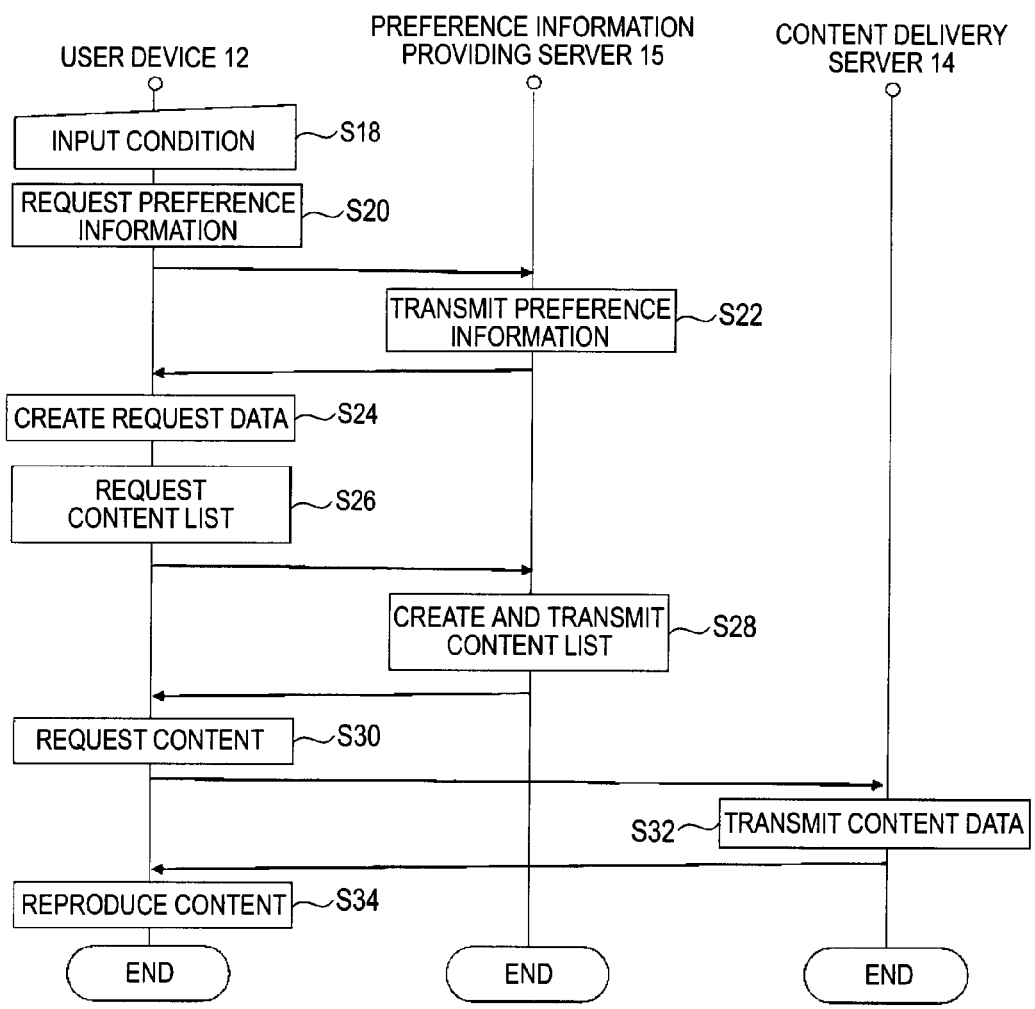
FIG. 12 is an operation sequence diagram of the content recommendation system in the embodiment.

Next, description will be made of the operation of the content recommendation system 10 realized by the above-mentioned configuration. FIGS. 11 and 12 are operation sequence diagrams of the content recommendation system 10. In the sequence diagrams shown in FIGS. 11 and 12, processing procedures of each section are shown by combination of the letter S (first letter of Step) which means a step and the numerals. Meanwhile, processing in which the preference information providing server 13 acquires the bibliographic information from the content delivery server 14 and the content feature information is created and stored in the content feature information storage section 52 is performed in the previous step.

In addition, processing, shown in FIG. 11, from the evaluation input of the content to the creation of the preference information and processing, shown in FIG. 12, from the input of the preference information conditions to the reproduction of the recommended content may be performed temporally continuously, and may be respectively performed independently. For example, various types of processing of the user device 12 shown in FIG. 12 may be performed in a device different from the user device 12 shown in FIG. 11.

First, in FIG. 11, when the evaluation for specific content such as content during reproduction is input to the user device 12 by the user (S10), the preference discrimination information supply section 32 transmits predetermined information such as the user identification information of the corresponding user, the content identification information, the evaluation detail, and the evaluation date and time to the preference information providing server 13, as preference discrimination information (S12).

The preference discrimination information acquisition section 54 of the preference information providing server 13 acquires the preference discrimination information transmitted from the user device 12, and stores the information in the preference discrimination information storage section 56 (S14). Although not shown in the drawing, as mentioned above, when the preference discrimination information is requested from the user device 12, the identification information of the content suitable for the request conditions is read out from the preference discrimination information storage section 56 at any time, and is transmitted to the user device 12.

On the other hand, the preference information creation section 58 creates the preference vectors of the user as the preference information on the basis of the preference discrimination information (S16). As mentioned above, the preference vectors of the same user are completely created, the corresponding preference vectors are read out from the preference information storage section 60, and the readout preference vectors are modified and stored again on the basis of newly transmitted preference discrimination information.

Subsequently, as shown in FIG. 12, when the user inputs the conditions of the preference information to the user device 12 (S18), the preference information acquisition section 34 requests the preference information by transmitting the conditions to the preference information providing server 13 (S20). The conditions of the preference information which are input in S18 are preference information that, to be stated most simply, the user oneself which is a requestor feels positive, but except for this, for example, as mentioned above, the environmental type at the time of the evaluation may be set to the conditions. In addition, when other preference information is desired, the attributes of the user may be designated, and the formation conditions of the user set such as the past regeneration histories may be designated.

When the request of the preference information transmitted from the user device 12 is acquired, the preference information creation section 58 of the preference information providing server 13 reads out preference information suitable for the conditions included in the request from the preference information storage section 60, and supplies it to the preference information providing section 62, so that the preference information providing section 62 transmits the preference information to the user device 12 (S22). Here, when the preference information suitable for the conditions is not stored in the preference information storage section 60, the preference information creation section 58 refers to the preference discrimination information, the user information, and the content feature information, as necessary, creates new preference information and then supplies it to the preference information providing section 62.

Meanwhile, the preference information transmitted to the user device 12 is converted into a binary file, the details of the preference information are not open to all users operating the user device 12, whereby it is possible to prevent the technique related to the preference information from flowing out.

When the requested preference information is acquired from the preference information providing server 13, the preference information acquisition section 34 of the user device 12 supplies the preference information to the content list acquisition section 36. The content list acquisition section 36 creates request data for requesting the content list from the preference information (S24). The request data include the preference information and the filtering conditions at the time of listing up content having features similar to this. The filtering conditions may be set by the user in this step, and may be determined in accordance with a predetermined rule which is previously set.

For example, when the content is a musical composition, the user designates a genre or a melody intended to be reproduced depending on the mood of that time. Alternatively, the conditions may be set in which musical compositions negatively evaluated by other people suitable for the user oneself or designation conditions in the past are excluded. Such conditions may be either as long as the conditions have a possible filtering pattern with reference to the content feature information, the preference discrimination information, and the user information which are maintained by the preference information providing server 13.

A plurality of patterns capable of being set as the filtering conditions is displayed in the user device 12, and the user may select the patterns. At this time, the pattern selected one time by the user is stored, and when next request data are created, the filtering conditions may be set by following the pattern. In addition, the type of content may be included in the filtering conditions. For example, the filtering conditions aimed at only a game application are designated, whereby it is possible to receive recommendation of the game application even when such a user performs only evaluation for a musical composition.

The content list acquisition section 36 requests the content list by transmitting the request data created in this way to the preference information providing server 13 (S26). When the request of the content list is acquired, the content list creation section 64 of the preference information providing server 13 extracts identification information of content which has a high degree of similarity with the preference information included in the request data and is suitable for the filtering conditions to create a content list, and then transmits it to the user device 12 (S28).

In this case, the content list creation section 64 first refers to content feature information stored by the content feature information storage section 52, to extract identification information of content which has features with a high degree of similarity with the preference information included in the request data. When the preference information and the content feature information are set to the preference vectors and the feature vectors as mentioned above, the degree of similarity thereof is evaluated by the angle between the vectors. That is, as the angle therebetween is smaller, the degree of similarity is higher.

When the degree of similarities of the preference information of the request data and the feature information of each content item included in the content feature information are respectively evaluated, the content list creation section 64 extracts identification information of content having the degree of similarity exceeding a predetermined threshold. Alternatively, the identification information of the predetermined number of content is extracted in order of high degree of similarity. The content of which the identification information is extracted is filtered by the filtering conditions, and the identification information of the content which is not suitable for the conditions is excluded.

The content feature information storage section 52 is referred when the attributes of content such as a type of content, a genre, and a melody are designated as the filtering conditions, and the preference discrimination information storage section 56, or in some case, the user information storage section 57 is referred when the past evaluation is designated, so that the identification information of the content to be excluded is acquired. The identification information of the content remaining after the filtering in the content having a high degree of similarity as the preference information is listed, and a final content list is made. Meanwhile, the evaluation of the degree of similarity and the order of filtering are not limited thereto, and filtering may be approximately performed before or after the evaluation of the degree of similarity in consideration of extraction efficiency and the like. A rule such as the order of extraction processing or the number of the content listed finally is previously set.

When the content list is acquired from the preference information providing server 13, the content list acquisition section 36 of the user device 12 supplies it to the content reproduction section 30. The content reproduction section 30 transmits the content list to the content delivery server 14 and requests content data (S30). When the content list is acquired from the user device 12, the content providing section 40 of the content delivery server 14 reads out data of the corresponding content from the content data storage section 44 on the basis of the content identification information described in the content list, and transmits the data to the user device 12 (S32).

The content reproduction section 30 of the user device 12 sequentially reproduces the content data transmitted from the content delivery server 14 (S34). When the evaluation input is performed on the reproduced content, processing from S12 is repeated again. By the above-mentioned processing, it is possible to recommend content data in accordance with the various conditions on the basis of the evaluation of the user for content.

Figure 13:
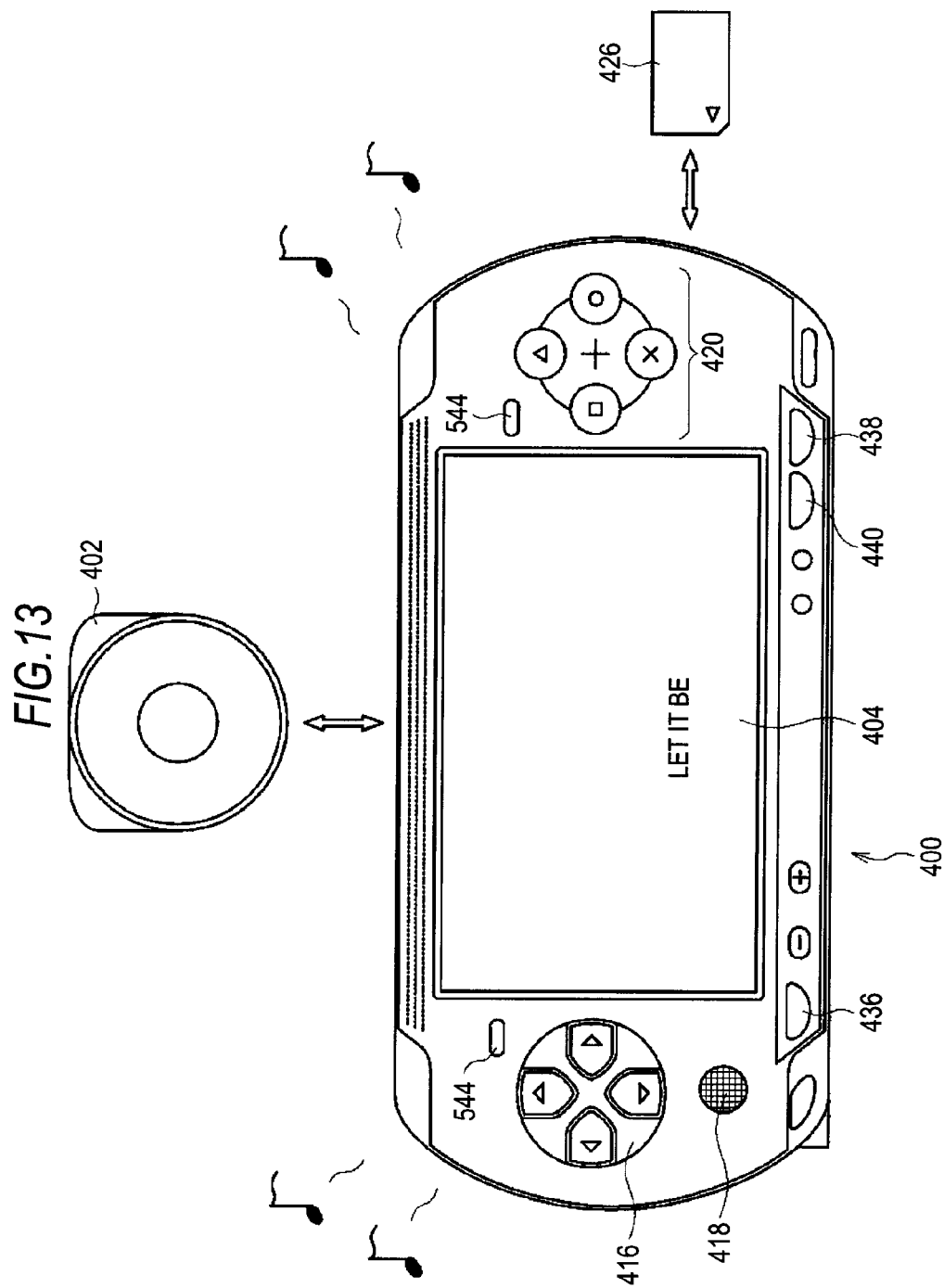
FIG. 13 is an appearance diagram of a portable game machine used as the user device in the embodiment.

Next, another example of a device used as the user device 12 will be described. FIG. 13 shows an appearance diagram of a portable game machine used as the user device 12. A portable game machine 400 executes programs such as a game program, besides reproducing digital content such as moving images, still images, and music. Each content is read out from an external storage medium capable of being attached and detached to and from the portable game machine 400, or is downloaded through data communication.

The external storage medium is a small-sized optical disc 402 such as a UMD (Universal Media Disc), a memory card 426 and the like. The optical disc 402 and the memory card 426 are respectively loaded to a drive unit, not shown, provided to the portable game machine 400. The optical disc 402 is able to store not only music data or still image data, but also moving image data of content having a relatively large data size such as a movie. The memory card 426 is a small-sized memory card capable of attached and detached to and from even a digital camera or a cellular phone, and data, created in other devices by the user oneself, such as still image data, moving image data, and voice data, or data passed to and from other devices are mainly stored in the memory card.

The portable game machine 400 is provided with an operation member such as a liquid crystal display 404, a cross-key 416, and an analog stick 418, or a button 420. The user grips the right and left ends of the portable game machine 400 with both hands, indicates the directions of the top, bottom, left and right using the cross-key 416 or the analog stick 418 mainly with the left-hand thumb, and performs various types of indications using the button 420 mainly with the right-hand thumb. A home button 436 is a button which is different from the cross-key 416 or the button 420, and is provided to a position difficult to press down even with any of the fingers when the right and left ends of the portable game machine 400 are gripped with both hands to prevent wrong operations.

A menu screen and a reproduction screen of each item of content are displayed on the liquid crystal display 404. The portable game machine 400 is provided with a communication function through a USB port or a wireless LAN, and receives and transmits data from and to other devices using this function. The portable game machine 400 further includes a selection button 440 and a start button 438. The start button 438 is a button for giving instructions of the start of a game, the reproduction start of content such as a movie or music, pause, and the like by a user. The selection button 440 is a button for selecting the menu items displayed on the liquid crystal display 404.

Figure 14:
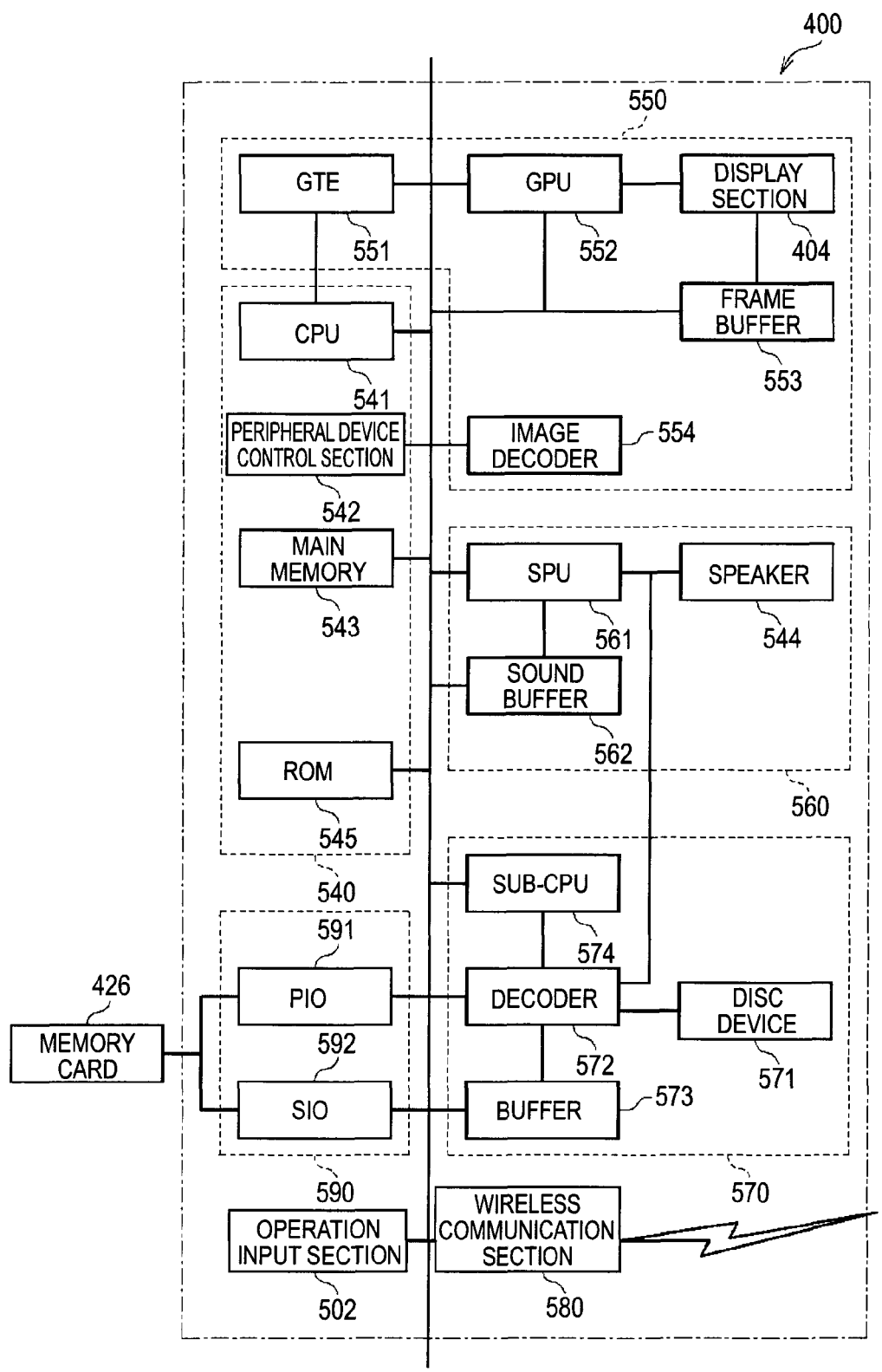
FIG. 14 is an internal circuit configuration diagram illustrating the portable game machine of FIG. 13.

FIG. 14 shows an internal circuit configuration of the portable game machine 400. The portable game machine 400 includes a control system 540 composed of a CPU 541, peripheral devices thereof and the like, a graphic system 550 composed of a GPU 552 for performing drawing on a frame buffer 553 and the like, a sound system 560 composed of an SPU (sound processing unit) 561 for generating a musical sound, a sound effect, etc. and the like, an optical disc control section 570 for performing the control of the optical disc 402 on which the application programs are recorded, a wireless communication section 580, an interface section 590, an operation input section 502, a bus to which each of the above-mentioned sections is connected, and the like.

The sound system 560 includes the SPU 561 for generating a musical sound, a sound effect and the like under the control of the control system 540, a sound buffer 562 in which waveform data and the like are recorded by this SPU 561, a speaker 544 for outputting a musical sound, a sound effect and the like generated by the SPU 561.

The SPU 561 includes a ADPCM decoding function of reproducing ADPCM-decoded voice data, a reproduction function of generating a sound effect and the like by reproducing waveform data stored in the sound buffer 562, and a modulation function of modulating and reproducing the waveform data stored in the sound buffer 562.

The optical disc control section 570 includes an optical disc device 571 for reproducing data such as a program recorded on the optical disc, a decoder 572 for decoding data in which, for example, an error correction code (ECC) is added and recorded, a buffer 573 for speeding up readout of data from the optical disc by temporarily storing data from the optical disc device 571. A sub-CPU 574 is connected to the above-mentioned decoder 572.

The interface section 590 includes a parallel I/O interface (PIO) 591 and a serial I/O interface (SIO) 592. These components are interfaces for connecting the memory card 426 and the portable game machine 400 to each other.

The operation input section 502 supplies an operation signal in accordance with the operation of the user to the CPU 541. The wireless communication section 580 performs wireless communication by the infrared port or the wireless LAN. This wireless communication section 580 transmits data to other devices directly or through a wireless communication network such as the Internet, under the control of the control system 540, or receives data from other devices.

The graphic system 550 includes a geometry transfer engine (GTE) 551, the GPU 552, the frame buffer 553, an image decoder 554, and the liquid crystal display 404.

The GTE 551 includes a parallel arithmetic operation mechanism for executing a plurality of arithmetic operations in parallel, and performs coordinate transformation, light source calculation, and arithmetic operation such as a matrix or a vector at a high speed in response to an arithmetic operation request from the main CPU 541. The control system 540 defines a three-dimensional model as a combination of a basic unit figure (polygon) such as triangle or quadrangle on the basis of the arithmetic operation result through the GTE 551, and sends drawing instructions, corresponding to each polygon for drawing an three-dimensional image, to the GPU 552.

The GPU 552 performs drawing of the polygon on the frame buffer 553 in accordance with the drawing instructions from the control system 540. In addition, the GPU 552 is able to perform flat shading, Gouraud shading for supplementing a color of the top of the polygon to determine a color within the polygon, or texture mapping for pasting a texture, stored in a texture region of the frame buffer, to the polygon.

The frame buffer 553 stores an image drawn by the GPU 552. This frame buffer 553 includes a so-called dual port RAM, and is able to simultaneously perform drawing from the GPU 552 or transfer from a main memory 543, and readout for display. In addition, this frame buffer 553 is provided with a color lock up table (CLUT) region in which a CLUT referenced when the GPU 552 performs the drawing of the polygon is stored, and the above-mentioned texture region in which the texture is stored, in addition to a display region which is output as a video output. The CLUT region and the texture region are dynamically changed with a change of the display region and the like.

The display section 3 displays an image stored in the frame buffer 553 by the control from the control system 540. By the control from the above-mentioned CPU 541, the image decoder 554 decodes image data of a still image or a moving image which are stored in the main memory 543 and are compressed and encoded by orthogonal transformation such as discrete cosine transformation, and stores the image data in the main memory 543.

The control system 540 includes the CPU 541, a peripheral device control section 542 for performing the interrupt control or the control of direct memory access (DMA) transfer and the like, the main memory 543 including a RAM, and a ROM 545. Programs such as an operating system for controlling each section of the portable game machine 400 are stored in the ROM 545. The CPU 541 controls the entirety of the portable game machine 400 by reading out the operating system stored in the ROM 545 into the main memory 543 and executing the readout operating system. The user device 12 can be also realized using such a portable game machine 400.

Figure 15:
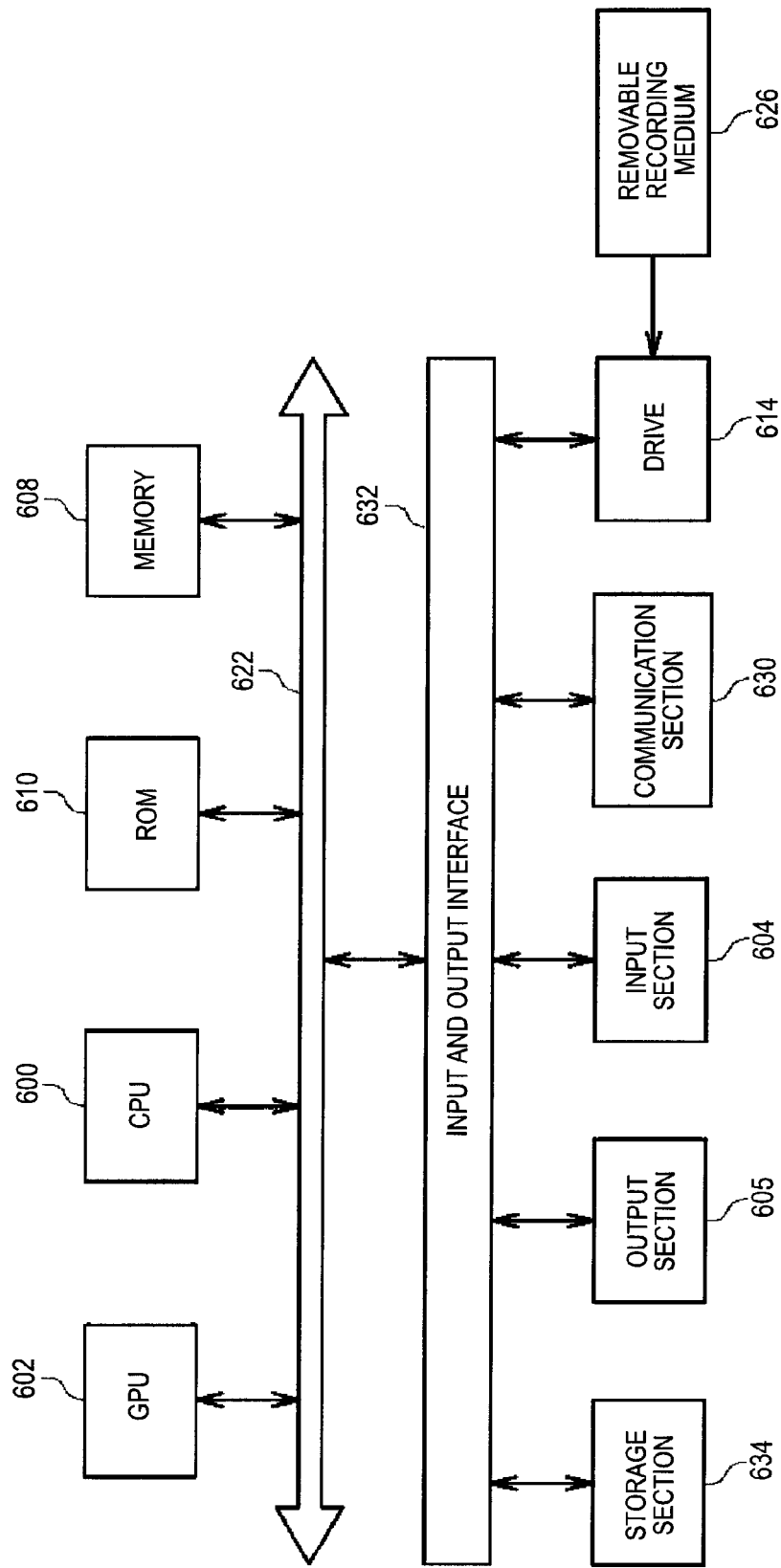
FIG. 15 is a diagram illustrating an internal circuit configuration of a general-purpose personal computer used as the user device in the embodiment.

FIG. 15 shows an internal circuit configuration of a general-purpose personal computer used as the user device 12. The general-purpose personal computer includes a main CPU 600, a graphic processor unit 602, an input section 604, and output section 605, a drive 614, a main memory 608, and a ROM 610, as a basic configuration. The main CPU 600 controls signal processing or internal components on the basis of programs such as an operating system or an application. The GPU 602 performs image processing.

Each of these sections is connected to each other through a bus line 622. An input and output interface 632 is further connected to the bus line 622. To the input and output interface 632, connected are a storage section 634 such as a hard disk or a nonvolatile memory, an output section 605 including a display or a speaker, an input section 604 including a keyboard, a mouse, a microphone and the like, a communication section 630 including a peripheral device interface such as USB or IEEE1394, and a network interface of a wired or wireless LAN, and a drive 614 for driving a removable recording medium 626 such as a magnetic disk, an optical disc or a semiconductor memory.

The main CPU 600 controls the entirety of the personal computer by executing an operating system stored in the storage section 634. In addition, the main CPU 600 executes various types of programs which are read out from the removable recording medium 626 and loaded to the main memory 608, or are downloaded through a communication section 630.

The GPU 602 has a function of a geometry transfer engine and a function of a rendering processor, and performs drawing processing in accordance with the drawing instructions from the main CPU 600 to store a display image in a frame buffer which is not shown. The GPU 602 converts the display image stored in the frame buffer into a video signal and outputs the resultant. The user device 12 can be also realized using such a personal computer.

According to the above-mentioned embodiment, the evaluation for the content performed on the user device by the user is aggregated in the preference information providing server, and the preference information is created using this and then provided to the user. Using request data created in the user device on the basis of the preference information, the preference information providing server creates a content list and further provides the content list to the user. Using such a configuration, minimal processing such as the evaluation of content, when the condition input of the preference information and the creation of request data performed in the user device is provided as API, detailed processing related to the feature information or the preference information of the content can all be performed in the preference information server. Therefore, it is possible to make the generation process of the preference information and the like unopened, and to prevent an intellectual property from flowing out. On the other hand, the evaluation input or the condition input from the user is made possible, whereby it is possible to provide information suitable for individual users, and to continuously accumulate new information in the preference information providing server.

The preference information providing server can provide various up-to-date information on the basis of the information accumulated in this way. Since the accumulated information or the feature information of the content is enormous, classification or storage thereof suffers from a large load of processing, and plenty of resources such as the hard disk capacity are necessary. These all things are supplied from the preference information providing server, whereby it is possible to receive the same service in any of the user devices irrespective of the processing capability or the resource capacity and the like. Thereby, for example, it is possible to share information between the user devices as if a content list based on the evaluation result performed in the personal computer used at ordinary times by one user is received in a portable audio device.

In addition, various types of information are managed at in the resource-rich server side, whereby it is possible to increase the number of items of features indicating the feature information or the preference information of the content, and to realize a content recommendation technique having a high level of accuracy. Further, since it is not necessary to transmit metadata and the like of the content to the user device, overhead due to communication hardly occurs. In addition, when an algorithm of processing related to the preference information is updated, it is possible to close update processing within the preference information providing server.

Further, the preference discrimination information or the preference information of each user is aggregated in the preference information providing server, whereby it is possible to provide various information in consideration of evaluations or preferences of other users. For example, another user having designated attributes, a user having preference similar to the user oneself, and a user or a user set having evaluated some content are extracted by various statistical methods, thereby allow the preference discrimination information or the preference information to be provided.

Further, in the embodiment, since the features of the content itself are evaluated and the content feature information is generated, it is possible to similarly treat various types of content items by making the features of interest common. For this reason, the content to be processed widely ranges over a moving image, a still image, a game application, a character medium, and the like, without being limited to a musical composition. In this way, a content list for which the user wishes at that time can be provided according to circumstances. As mentioned above, since the preference discrimination information or the preference information is accumulated and stored for each user, it is possible to evaluate the relevance of the content irrespective of the type, and to add the content to a list of recommend content.

For example, when the relevance between the content items such as a high probability that a person who likes animation plays a specific game is proved by the statistical analysis of the preference discrimination information, the level of the relevance is digitized, and is stored in a storage device which is not shown. In this case, for example, the combinations of the content to be evaluated by the same user are compared for each user, and as the number of the users who evaluate the same combination becomes greater, the relevance between the content items becomes higher.

At the time of creating a content list, weighting based on the level of the relevance is performed with respect to the degree of similarity between the preference information and the content feature information, and thus the content having a high relevance is easily recommended. In this way, it is possible to realize the recommendation having a high level of accuracy based on not only the preference information but also the multilateral evaluation.

Further, when the reproduction status of the content in the user device is included in the preference discrimination information and accumulated and stored in the preference information providing server, a time change in a reproduction tendency of the content is proved for each user. It is possible to analogize a change in feelings of the user who is absorbed in the content or tired thereof, from this time change. Therefore, it is possible to realize more effective recommendation by adding the corresponding information to a list of recommended content.

For example, when such information that a user who purchased a certain game enjoys the game every day for a month after purchase and thereafter, the frequency of enjoyment becomes small is obtained, the fact that the user is tired of the game can be analogized. In such a case, after the lapse of a predetermined period of time from the time at which the execution frequency of the game drastically drops, when an additional item capable of being used in the game or the same kind of another game is easily recommended, this is preferable timing for user. Therefore, when the content recommendation system of the embodiment is applied to a product sales system, more effective sales promotion can be realized.

The environmental type such as the evaluation area or the evaluation environment is included in the preference discrimination information, whereby it is possible to acquire a tendency of preference, popularity and unpopularity of content, or a time change thereof for each environmental type, in addition to the attributes of the user. Therefore, it is possible to easily provide information having a high utility value various areas including marketing, with a minimum of time and effort of each user.

As described above, the embodiment of the present disclosure has been described. The above-mentioned embodiment is merely illustrative of the present disclosure, and it will be obvious to those skilled in the art that various modified examples may be applied to the combination of each component or each process, and such modified examples are also included in the scope of the present disclosure.

The present disclosure contains subject matter related to that disclosed in Japanese Priority Patent Application JP 2010-128242 filed in the Japan Patent Office on Jun. 3, 2010, the entire contents of which is hereby incorporated by reference.

What is claimed is:

1. A content recommendation system, comprising:
a client terminal operated by a user; and
a recommendation server comprising a first one or more processors configured to:
  recommend content to the client terminal through a network;
  accumulate and store preference discrimination information in which information related to an evaluation for content input to the client terminal by the user and identification information of the user are associated with each other;
  store content feature information in which data that indicates features of the input content is associated with identification information of the input content;
  create preference information of the user by integration of the evaluation for the input content with the content feature information, wherein the preference information is created based on an evaluation time at which the user performs the evaluation for the input content at the client terminal;
  transmit, to the client terminal, a list of the recommended content, extracted by integration of a degree of similarity of the content feature information with the preference information,
  wherein the preference information includes an evaluation date;
  wherein a second one or more processors in the client terminal are configured to:
    receive an input to designate an evaluation time slot as a condition for the creation of the preference information from the user operating the client terminal; and
    transmit the input to designate the evaluation time slot to the recommendation server; and
  wherein the first one or more processors in the recommendation server are configured to create preference information to limit a time slot based on the content feature information and the preference discrimination information evaluated at the evaluation time slot designated by the user.

2. The content recommendation system according to claim 1, wherein the second one or more processors are further configured to receive an input to designate conditions of extraction for a first user from a second user that operates the client terminal, and transmit the input to the recommendation server.

3. The content recommendation system according to claim 2, wherein the first one or more processors are further configured to create, preference information for a user set including a plurality of users extracted using the conditions transmitted from the client terminal, by integration of preference information of the plurality of users.

4. The content recommendation system according to claim 1, wherein the first one or more processors are further configured to create preference information of a user set by integration of preference information of users that belongs to the user set clustered in accordance with a predetermined rule.

5. The content recommendation system according to claim 1, wherein the first one or more processors are configured to:
  store the content feature information of a plurality of types of content having different reproduction formats, and
  set a type of content to the recommended content, different from a type of content evaluated by the user that operates the client terminal.

6. The content recommendation system according to claim 1, wherein the first one or more processors are configured to:
  transmit the created preference information to the client terminal,
    wherein the second one or more processors in the client terminal are further configured to:
      generate request data obtained by addition of filtering conditions to the preference information acquired from the recommendation server, and
      transmit the request data to the recommendation server, and
  wherein the first one or more processors are configured to filter using the filtering conditions designated by the request data at the time of extraction of the list of recommended content.

7. The content recommendation system according to claim 6, wherein the first one or more processors are configured to transmit the preference information in a format which makes the content unreadable by the user of the client terminal.

8. The content recommendation system according to claim 1, wherein the information related to the evaluation for the input content included in the preference discrimination information includes an evaluated place,
  wherein the second one or more processors in the client terminal are configured to:
    receive an input that designates an evaluated area as a condition for creation of preference information from the user operating the client terminal, and
    transmit the input that designates the evaluated area to the recommendation server, and
  wherein the first one or more processors preference information creation section in the recommendation server are configured to create preference information to limit an evaluation area based on the content feature information and the preference discrimination information evaluated within the evaluated area designated by the user.

9. The content recommendation system according to claim 1, wherein the first one or more processors in the recommendation server are configured to:
  compare combinations of content to be evaluated by same user with reference to the preference discrimination information,
  evaluate a level of relevance between content items of the combination by a plurality of users that evaluate similar combination, and in an event the degree of similarity of the content feature information with the preference information is evaluated, perform weighting on the degree of similarity in accordance with the level of relevance.

10. The content recommendation system according to claim 1, wherein after lapse of a particular time period from a time at which execution frequency of the content falls below a particular execution frequency, a new content is recommended to the user of the client terminal.

11. A content recommendation device, connected to a plurality of client terminals through a network, that recommends content to each of the plurality client terminals, the content recommendation device comprising:
  a first one or more processors configured to:
    recommend the content to a client terminal of the plurality of client terminals through the network;
    accumulate and store preference discrimination information in which information related to an evaluation for content input to a client terminal of the plurality of client terminals by a user and identification information of the user are associated with each other;
    store content feature information in which data that indicates features of the input content is associated with identification information of the input content;
    create preference information of the user by integration of the evaluation for the input content with the content feature information, wherein the preference information is created based on an evaluation time at which the user performs the evaluation for the input content at the client terminal;
    transmit, to the client terminal, a list of the recommended content, extracted by evaluation of a degree of similarity of the content feature information with the preference information,
    wherein the preference information includes an evaluation date;
  wherein a second one or more processors in the client terminal are configured to:
    receive an input for designation of an evaluation time slot as a condition for the creation of the preference information from the user operating the client terminal; and
    transmit the input for designation of the evaluation time slot to the recommendation server; and
  wherein the first one or more processors in the recommendation server are configured to create preference information to limit a time slot based on the content feature information and the preference discrimination information evaluated at the evaluation time slot designated by the user.

12. The content recommendation device according to claim 11, wherein the one or more processors are configured to:
  compare combinations of content to be evaluated by same user with reference to the preference discrimination information;
  evaluate a level of relevance between content items of the combination by a plurality of users evaluate similar combination, wherein the preference discrimination information is created based on an evaluation time at which the user performs the evaluation for the content at the client terminal;
  create a list of recommended content by reflection of the evaluation result to extraction processing of recommend content, and transmit the list of recommended content to the client terminal of the plurality of client terminals; and
  set a type of content to the recommended content, different from a type of content evaluated by the user that operate the client terminal.

13. A content recommendation method, comprising:
  in a recommendation server communicatively coupled to a client terminal operated by a user, the recommendation server comprising a memory, and a first one or more processors:
  recommending, by the first one or more processors, content to the client terminal through a network;
  accumulating and storing in the memory, by the first one or more processors, preference discrimination information, in which information related to an evaluation for content input to the client terminal by the user and identification information of the user are associated with each other;
  storing in the memory, by the first one or more processors, content feature information, in which data indicating features of the input content is associated with identification information of the input content;
  creating by the first one or more processors, preference information of the user by integrating the evaluation for the input content with the content feature information for the user, wherein the preference information is created based on an evaluation time at which the user performs the evaluation for the input content at the client terminal; and
  transmitting, by the first one or more processors, to the client terminal, a list of the recommended content, extracted by evaluating a degree of similarity of the content feature information with the preference information,
    wherein the preference information includes an evaluation date;
  wherein a second one or more processors in the client terminal are configured to:
    receive an input for designating an evaluation time slot as a condition for the creation of the preference information from the user operating the client terminal; and
    transmit the input for designating the evaluation time slot to the recommendation sever; and
  wherein the first one or more processors in the recommendation server are configured to create preference information to limit a time slot based on the content feature information and the preference discrimination information evaluated at the evaluation time slot designated by the user.

14. The method of claim 13, further comprising:
  transmitting a list of recommended content to the client terminal operated by the user, wherein the recommended content is based on preference information of another user; and
  wherein the client terminal is configured to receive an input for designating conditions of extraction for the user from the other user operating another client terminal, and transmit the input to the recommendation server.

15. The method of claim 13, further comprising:
creating, preference information of a user set including a plurality of users extracted using conditions transmitted from the client terminal, by integrating preference information of the plurality of users.

16. The method of claim 13, further comprising:
creating preference information of each user set by integrating preference information of users belonging to a user set clustered in accordance with a predetermined rule.

17. A non-transitory computer-readable medium, storing thereon computer executable instructions that cause a first one or more processors in a recommendation server to perform operations, comprising:
recommending content to a client terminal operated by a user through a network;
accumulating and storing in a memory of the recommendation server, by the first one or more processors in the recommendation server, preference discrimination information in which information related to an evaluation for content input to the client terminal by the user and identification information of the user are associated with each other;
storing in the memory, by the first one or more processors in the recommendation server, content feature information, in which data indicating features of the input content is associated with identification information of the input content;
creating by the first one or more processors, preference information for the user by integrating the evaluation for the input content with the content feature information for the user, wherein the preference information is created based on an evaluation time at which the user performs the evaluation for the input content at the client terminal; and
transmitting, by the first one or more processors, to the client terminal, a list of recommended content, extracted by evaluating a degree of similarity of the content feature information with the preference information,
wherein the preference information includes an evaluation date;
wherein a second one or more processors in the client terminal are configured to:
receive an input for designating an evaluation time slot as a condition for the creation of the preference information from the user operating the client terminal; and
transmit the input for designating the evaluation time slot to the recommendation sever; and
wherein the first one or more processors in the recommendation server are configured to create preference information to limit a time slot based on the content feature information and the preference discrimination information evaluated at the evaluation time slot designated by the user.

18. The non-transitory computer-readable medium of claim 17, wherein the computer executable instructions further comprises code that cause the first one or more processors to perform:
transmitting a list of recommended content to the client terminal operated by the user, wherein the recommended content is based on preference information of another user,
wherein the client terminal is configured to receive an input for designating conditions of extraction for the user from the other user operating another client terminal, and transmit the input to the recommendation server.

19. The non-transitory computer-readable medium of claim 17, wherein the computer executable instructions further comprises code that cause the first one or more processors to perform:
creating, preference information of a user set including a plurality of users extracted by the conditions transmitted from the other client terminal, by integrating preference information of the plurality of users.

20. The non-transitory computer-readable medium of claim 17, wherein the computer executable instructions further comprises code that cause the first one or more processors to perform:
transmitting a list of recommended content, based on preference information of a user different from the user operating the client terminal which is a destination of the list of recommended content, to the client terminal, and
wherein the client terminal is configured to receive an input for designating conditions of extraction for the user different from the user operating the client terminal, and transmit the input to the recommendation server.

* * * * *